(12) United States Patent
Holten et al.

(10) Patent No.: US 10,064,516 B2
(45) Date of Patent: Sep. 4, 2018

(54) DEVICE FOR FROTHING A LIQUID

(71) Applicant: KONINKLIJKE PHILIPS N.V., Eindhoven (NL)

(72) Inventors: Hendrikus Lodewijk Joseph Franciscus Holten, Eindhoven (NL); Joeke Noordhuis, Eindhoven (NL); Victor Hennink, Eindhoven (NL); Fransiscus Hermannus Feijen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 348 days.

(21) Appl. No.: 14/774,170

(22) PCT Filed: Mar. 5, 2014

(86) PCT No.: PCT/IB2014/059445
§ 371 (c)(1),
(2) Date: Sep. 10, 2015

(87) PCT Pub. No.: WO2014/140998
PCT Pub. Date: Sep. 18, 2014

(65) Prior Publication Data
US 2016/0015206 A1    Jan. 21, 2016

Related U.S. Application Data

(60) Provisional application No. 61/775,945, filed on Mar. 11, 2013.

(51) Int. Cl.
*A47J 31/40*    (2006.01)
*A47J 31/44*    (2006.01)
(Continued)

(52) U.S. Cl.
CPC ....... *A47J 31/4485* (2013.01); *A47J 31/4489* (2013.01); *A47J 31/46* (2013.01);
(Continued)

(58) Field of Classification Search
CPC .... A47J 31/4485; A47J 31/46; A47J 31/4489; B01F 3/04446; B01F 3/04503; B01F 2003/04936
(Continued)

(56) References Cited

U.S. PATENT DOCUMENTS 4,715,274 A    12/1987 Paoletti
4,922,810 A *  5/1990 Siccardi .............. A47J 31/4485
                                                261/DIG. 16
(Continued)

FOREIGN PATENT DOCUMENTS

WO    2011158171 A1    12/2011
WO    2012029019 A1    3/2012

*Primary Examiner* — Thien S Tran

(57) ABSTRACT

A device (1) for frothing a liquid comprises a settling chamber (10) providing space (11) in the device (1) for liquid froth to be formed during operation of the device (1); an inlet (20) for letting in liquid to be frothed to the device (1); an inlet (30) for letting in steam to the device (1) for realizing a pumping effect on the liquid to be frothed and thereby forming a steam/liquid flow to be supplied to the settling chamber (10); a combined inlet/outlet (40) for letting in frothing gas to the device (1) for frothing the liquid and letting out liquid froth from the settling chamber (10); and an obstacle (50) arranged in the device (1) for determining a position in the device (1) where frothing gas that is let in to the device (1) during operation of the device (1) encounters the steam/liquid flow.

13 Claims, 4 Drawing Sheets

(51) Int. Cl.
*A47J 31/46* (2006.01)
*B01F 3/04* (2006.01)

(52) U.S. Cl.
CPC ...... *B01F 3/04446* (2013.01); *B01F 3/04503* (2013.01); *B01F 2003/04936* (2013.01)

(58) Field of Classification Search
USPC .......... 99/275, 279, 293, 453, 454; 426/474, 426/477, 570
See application file for complete search history.

(56) References Cited

U.S. PATENT DOCUMENTS

| | | | |
|---|---|---|---|
| 5,295,431 A | 3/1994 | Schiettecatte | |
| 5,339,725 A * | 8/1994 | De'Longhi | A47J 31/4485 261/DIG. 76 |
| 5,339,726 A | 8/1994 | Poulson | |
| 6,499,389 B1 | 12/2002 | Probst | |
| 8,367,133 B2 | 2/2013 | Keller | |
| 2009/0007795 A1* | 1/2009 | Turpin | A47J 31/4485 99/293 |
| 2010/0011968 A1* | 1/2010 | Fin | A47J 31/4485 99/323.1 |
| 2010/0178406 A1 | 7/2010 | Verbeek | |

* cited by examiner

US 10,064,516 B2

DEVICE FOR FROTHING A LIQUID

This application is the U.S. National Phase application under 35 U.S.C. § 371 of International Application No. PCT/IB2014/059445, filed on Mar. 5, 2014, which claims the benefit of U.S. Provisional Application 61/775,945 filed Mar. 11, 2013. These applications are hereby incorporated by reference herein.

FIELD OF THE INVENTION

The invention relates to a device for frothing a liquid, comprising a settling chamber providing space in the device for liquid froth to be formed during operation of the device; an inlet for letting in liquid to be frothed to the device; and an inlet for letting in steam to the device for realizing a pumping effect on liquid entering the device through the inlet for letting in liquid to the device and thereby forming a steam/liquid flow to be supplied to the settling chamber.

The invention furthermore relates to a coffee maker, comprising a brewing space for allowing coffee extract to interact with water, and further comprising a device for frothing a liquid as mentioned.

BACKGROUND OF THE INVENTION

Frothing a liquid involves supplying a gas to the liquid and mixing the liquid with the gas, for the purpose of obtaining a mass of bubbles in the liquid, which is commonly referred to as foam. A practical example of liquid to be frothed is milk. Especially in the field of making coffee and coffee specialties, there is a need for a device which is capable of frothing milk in a user-friendly manner. It is a well-known option to combine a frothing process of milk with a heating process of the milk, wherein air is supplied to the milk for obtaining foam, and wherein steam is supplied to the milk for increasing the temperature of the milk. Steam may also be used for realizing a pumping effect on the liquid to be frothed. To that end, the steam may be conducted through a restriction, wherein underpressure is created as the steam expands, which underpressure is suitable for causing suction of the liquid.

WO 2011/158171 A1 discloses a device for frothing a liquid which comprises a first space having an outlet for allowing content from the space to flow out of the space, means for supplying the liquid to be frothed to the first space, and a second space for allowing the liquid to mix with a frothing gas in order for a frothing process to take place. The second space is open to the first space, and has an inlet for receiving content from the first space, which is separated from the outlet of the first space by a free space for containing the frothing gas and for allowing for a supply of the frothing gas to the second space under the influence of a flow of liquid from the first space to the second space. Thus, at the position of this free space, when the device is operated and frothing gas is present, the frothing gas is allowed to flow into the second space and mix with the liquid to be frothed, wherein the gas can be made to flow under the influence of a flow of liquid to be frothed from the first space to the second space. In the second space, a swirling movement of the liquid and the frothing gas is induced for having the actual frothing process. This may be realized on the basis of having a tangential supply of the liquid and the frothing gas on a concavely curved surface, for example. It is noted that on the basis of a direction of the tangential supply of the liquid, a direction of the swirling movement of the liquid and the frothing gas, i.e. a direction of the swirling movement of the liquid froth during the frothing process, can be known. In particular, any skilled person can understand and predict what a rotation direction of the swirling movement will be, as the swirling movement is obtained on the basis of a continuation of a flow of the liquid which is bent as a result of contact to the concavely curved surface.

As a free inflow of frothing gas is possible in the configuration with the two spaces, namely at a position where one space ends and another space begins, as seen in a direction of a flow of liquid through the device, a certain intake of frothing gas can always be guaranteed, wherein disadvantageous effects which might influence the intake, particularly clogging effects, are avoided.

WO 2012/029019 A1 discloses a way of controlling the intake of frothing gas in the device as known from WO 2011/158171 A1. A tube that is provided for letting out the liquid froth is also used for letting out excess frothing gas. Furthermore, a number of requirements in respect of ratios of dimensions of components of the device are defined, which contribute to obtaining a high quality of liquid froth without excessive or insufficient foam formation or very coarse foam bubbles.

Although the type of device for frothing a liquid as known from WO 2011/158171 A1 and WO 2012/029019 A1 is practical, and capable of realizing excellent frothing results, there are some drawbacks related to that specific type. In the first place, the sound level associated with operation of the device is high when compared to other types of device for frothing a liquid, especially the types in which the frothing gas is supplied through a channel or the like. The reason is found in the fact that a high speed steam jet that travels through air or another frothing gas produces high frequency noise. This problem may be solved by providing appropriate shielding, but doing so requires extra components in the device and involves extra costs. In the second place, a small fraction of the liquid droplets may not be caught by the inlet of the second space. As a result, especially in case the liquid is milk, this may cause a need for cleaning effort. In the third place, in practice, the device is quite difficult to produce, because accuracy needs to be high in order to realize diameters of various components as required, and because it is advantageous to have taper angles at various positions of the device.

SUMMARY OF THE INVENTION

It is an object of the invention to provide another type of device for frothing a liquid than the type as known from WO 2011/158171 A1 and WO 2012/029019 A1. Furthermore, it is an object of the invention to take measures for ensuring that a frothing process can take place in the device in a well-controlled manner.

The objects of the invention are achieved by providing a device for frothing a liquid which comprises the settling chamber, the inlet for letting in liquid to the device and the inlet for letting in steam to the device as mentioned earlier, and which further comprises a combined inlet/outlet for letting in frothing gas to the device for frothing the liquid and letting out liquid froth from the settling chamber, and an obstacle arranged in the device for determining a position in the device where frothing gas that is let in to the device during operation of the device encounters the steam/liquid flow.

In the device according to the invention, an inlet for letting in frothing gas is combined with an outlet for letting out liquid froth from the settling chamber. Hence, there is no longer a configuration with two spaces and a free space for supplying the frothing gas. Still, the combined inlet/outlet of the device according to the invention is not comparable to conventional channels or the like of other conventional devices for supplying the frothing gas, which are susceptible to clogging. For the purpose of actually being capable of letting out the liquid froth, the combined inlet/outlet cannot be designed as a narrow channel, as in such a case, the outflow of the liquid froth would be hindered or even impossible. Thus, in the device according to the invention, the fact is that intake of the frothing gas is done through an inlet instead of through a free space, but there is still no risk of clogging on the basis of the combination with the discharge of the liquid froth. Therefore, having the combined inlet/outlet in the device offers the advantage of simplicity of design without involving a risk of clogging as a disadvantageous side-effect.

By combining the inlet of frothing gas with the outlet of liquid froth, it is not so accurately defined where the frothing gas reaches the steam/liquid flow. However, in respect of most if not all practical applications of a device for frothing a liquid, it is desirable to have both a well-controlled volume and a well-controlled temperature of liquid froth to be delivered by the device. If the frothing gas were to reach the steam/liquid flow at different positions, depending on arbitrary factors during operation of the device, a fraction of the steam that is kept from condensing on the liquid would vary. As a result, a suction force exerted by of the steam on the liquid would vary, and such a situation would involve different flow rates of the liquid.

In order to avoid the possible disadvantageous effects of the application of a combined inlet/outlet as mentioned in the foregoing, the invention proposes to provide the device for frothing a liquid with an obstacle arranged in the device for determining a position in the device where frothing gas that is let in to the device during operation of the device encounters the steam/liquid flow. In particular, such obstacle may be arranged in the settling chamber. In a process of designing the device according to the invention, it is very well possible for a skilled person to assess where an incoming flow of frothing gas may be expected, namely in a central portion of the swirling movement of the liquid froth during the frothing process, i.e. a central portion of the settling chamber, and how the obstacle should be shaped, positioned and oriented in order to achieve that it is guaranteed that the incoming flow is guided towards a predetermined position in the device for encountering the steam/liquid flow.

In particular, it is advantageous for the obstacle to be in the way of the incoming flow of frothing gas, so that it is not possible for the frothing gas to reach the steam/liquid flow without following the obstacle. The obstacle may also be in the way of liquid froth performing a swirling movement in the settling chamber during operation, so that space for frothing gas is created at a side of the obstacle facing away from the flow of liquid froth. According to another advantageous option, the obstacle is used as a means for the steam/liquid flow to collide with. The collisions that take place during operation of the device ensure a good mixing process, while a well-defined path of frothing gas towards a predetermined position is realized.

For sake of clarity, it is noted that during operation of the device for frothing a liquid, frothing gas is continually absorbed in the steam/liquid flow and removed from the settling chamber in the outgoing flow of liquid froth. On the basis of this fact, underpressure is obtained and an ingoing flow of frothing gas is induced, so that the frothing gas that is used in the frothing process is continually replenished.

Applying an obstacle is a relatively simple manner of controlling a supply of frothing gas, wherein there is no need for complex and expensive components for performing measurements of parameters of an outgoing flow of liquid froth and making adjustments to parameters related to the operation of the device on the basis of feedback about the first-mentioned parameters. The obstacle may be embodied in any suitable manner. For example, the obstacle may comprise a stick-shaped member extending through the settling chamber, or may be shaped like a sheet, or a knife having a sharp edge that is arranged such as to face the steam/liquid flow.

In a case in which the obstacle is positioned in a path of the steam/liquid flow for making the steam/liquid flow collide with the obstacle, it may be so that at least a portion of the obstacle is positioned right opposite the inlet for letting in steam to the device, at a distance which is very small compared to a required distance for the steam to fully condense on the liquid. In this respect, it is noted that a practical example of the latter distance is in an order of 10 to 15 mm, and that a practical example of the first distance is an order of 1 to 5 mm. By making the steam/liquid flow collide with an obstacle right outside the inlet for letting in the steam, frothing gas is absorbed by the steam/liquid flow at that very position, on the basis of which it is achieved that frothing gas is drawn to the steam/liquid flow in a situation in which only a small fraction of the steam has already condensed on the liquid. In that way, most of the kinetic energy provided by the steam to the steam/liquid flow can be preserved, so that the flow is not decelerated too much and the frothing process can take place in an optimal manner as far as the flow speed is concerned, wherein virtually all of the steam condenses on the liquid in the settling chamber. High speed steam helps the mixing process and yields finer liquid froth.

In an advantageous embodiment of the device according to the invention, a side of the obstacle facing the inlet for letting in steam to the device is provided with a sharp edge. On the basis of the application of the sharp edge, the position where the frothing gas reaches the steam/liquid flow is defined most accurately, as the position is determined by the relatively small width of the sharp edge at the top of the edge. Furthermore, the sharp edge can be positioned such as to cause the steam/liquid flow to split, wherein effective incorporation of frothing gas into the steam/liquid flow can take place when the two flows of the split steam/liquid flow are allowed to reunite after having moved around the obstacle, as frothing gas that is present behind the obstacle as seen in a direction of the steam/liquid flow is sandwiched between the two reunited flows, as it were.

As mentioned in the foregoing, it is an option for the obstacle to be positioned in a path of the steam/liquid flow for making the steam/liquid flow collide with the obstacle. According to another option, which is an alternative or an additional option, the obstacle may be adapted to create a pathway for the frothing gas in the settling chamber by being positioned in a path of the liquid froth that is obtained during operation. In such a case, a pathway for the frothing gas is created behind the obstacle as seen in a direction of the swirling movement that is performed by the liquid froth during the frothing process. Frothing gas that enters the settling chamber follows the pathway defined by the obstacle and reaches the steam/liquid flow at a predetermined position in the device. In this respect, it is advantageous for the obstacle to be arranged such as to extend through the settling chamber.

In a practical embodiment of the arrangement in which the obstacle extends through the settling chamber, one end of the obstacle is attached to an inner wall of the settling chamber, and another end of the obstacle is positioned right opposite the inlet for letting in steam to the device, at a distance which is very small compared to dimensions of the settling chamber. As a result of the positioning of the other end of the obstacle as mentioned, the frothing process can take place in an optimal manner as far as the flow speed is concerned, as explained earlier. By way of example, it is noted that the distance as mentioned may be in a range of 1 to 5 mm, whereas a height of the settling chamber may be in a range of 10 to 30 mm, and a width/diameter of the settling chamber may be in a range of 10 to 25 mm.

According to yet another alternative or additional option, the obstacle may comprise an inwardly curved edge of an inner wall of the settling chamber, which is adapted to act like a jump for the liquid froth during operation, thereby creating radial space between the liquid froth and the inlet for letting in steam to the device. Advantageously, the orientation of the inwardly curved edge is chosen such as to provide for a jump (formed like a small-scale ski jump, as it were) which is arranged along a course of a swirling movement that is performed by the liquid froth in the settling chamber during operation. In such a case, radial dimensions of the swirling movement are locally decreased, so that it is possible for the liquid froth to move over the inlet for letting in steam to the device, whereby a space for containing frothing gas is created at that location. Preferably, a position of the jump as seen along an inner circumference of the settling chamber is close to position of the inlet for letting in steam to the device as seen in the same direction, so that the inlet for letting in steam is right behind the jump as seen in a rotation direction of the swirling movement, wherein it is impossible for the liquid froth to reach the inlet.

In a preferred embodiment, the device for frothing a liquid comprises guiding means for guiding liquid froth out of the settling chamber through the combined inlet/outlet. By using such means, the intake of frothing gas is not disturbed by liquid froth blocking the way of the frothing gas as the liquid froth builds up, which might otherwise happen. Hence, by using such means, a stationary frothing process can be guaranteed, which is not hindered by the formation of the liquid froth.

Advantageously, at least a surface of the guiding means is oriented as an extension of a swirling movement that is performed by the liquid froth in the settling chamber during operation, adding a direction along a longitudinal axis of the swirling movement to the swirling movement. In this way, a natural flow of the liquid froth is not disturbed on the one hand, while a situation in which the liquid froth keeps swirling inside the settling chamber is avoided, namely by adding a direction along the longitudinal axis of the swirling movement to the swirling movement. Hence, it is possible to direct the swirling liquid froth towards the combined inlet/outlet and thereby discharge the liquid froth from the settling chamber. For example, the guiding means may comprise a rib arranged on an inner wall of the settling chamber, wherein the rib extends according to a spiraling course in a direction towards the combined inlet/outlet. The course of the rib may be chosen such as to be fully adjusted to the swirling movement that is performed by the mixture of liquid and frothing gas in the settling chamber in the frothing process, so that the liquid froth is smoothly guided in a direction towards the combined inlet/outlet. In that way, the rib may assist in realizing a quick discharge of liquid froth from the settling chamber.

Alternatively or additionally, the guiding means may comprise a ring-shaped element arranged in the settling chamber, wherein a guiding surface of the ring-shaped element at a side of the ring-shaped element facing away from the combined inlet/outlet extends according to a spiraling course in a direction towards the combined inlet/outlet. During operation of the device for frothing liquid, the liquid froth may pass through the central space of the ring-shaped element, while the guiding surface helps in discharging the liquid froth quickly towards the combined inlet/outlet, so that the settling chamber does not get stuffed with liquid froth and the frothing process including the intake of frothing gas needed in the process are not hindered. For sake of completeness, it is noted that due to centrifugal forces acting during the swirling movement of the liquid froth, a largest concentration of the liquid froth can be expected to be present in a ring-shaped area delimited by an inner wall of the settling chamber, so that the ring-shaped element can really have an effective influence on the discharge of the liquid froth.

Furthermore, in respect of the discharge of the liquid froth, it is noted that the device may be oriented such that the combined inlet/outlet extends in respect to the settling chamber in a downward direction, so that the discharge may also be promoted by gravity.

A number of structural features may be applicable to a practical embodiment of the device for frothing a liquid. In the first place, it is very practical for a diameter of the combined inlet/outlet to be significantly larger than a diameter of the inlet for letting in liquid to the device and a diameter of the inlet for letting in steam to the device. In the second place, a diameter of the combined inlet/outlet may be of the same order as a diameter of the settling chamber. In particular, the settling chamber may be shaped like a cylinder having a circular inner circumference, wherein both the inlet for letting in liquid to the device and the inlet for letting in steam to the device may be oriented substantially perpendicular to a longitudinal axis of the settling chamber, and wherein the combined inlet/outlet may be arranged as an extension of the settling chamber, in a direction along the longitudinal axis of the settling chamber. As mentioned in the foregoing, a practical example of the diameter of the settling chamber is a diameter which is in a range of 10 to 25 mm. A practical example of the diameter of the combined inlet/outlet is a diameter which is in the same range, or which is somewhat smaller, wherein a difference between the diameter of the settling chamber and the diameter of the combined inlet/outlet may be about 2 mm, for example. A practical example of the diameter of the inlet for letting in liquid to the device is a diameter which is in a range of 1 to 2 mm, and the same is applicable to the diameter of the inlet for letting in steam to the device.

It is noted that the concept of having guiding means for guiding liquid froth out of the settling chamber through the combined inlet/outlet does not necessarily need to be dependent on the concept of having an obstacle for determining a position in the device where frothing gas that is let in to the device during operation of the device encounters the steam/liquid flow. Thus, the invention also relates to a device for frothing a liquid which comprises a settling chamber providing space in the device for liquid froth to be formed during operation of the device; an inlet for letting in liquid to be frothed to the device; an inlet for letting in steam to the device for realizing a pumping effect on liquid entering the device through the inlet for letting in liquid to the device and thereby forming a steam/liquid flow to be supplied to the settling chamber; a combined inlet/outlet for letting in frothing gas to the device for frothing the liquid and letting out liquid froth from the settling chamber; and guiding means for guiding liquid froth out of the settling chamber through the combined inlet/outlet.

In a practical embodiment, the guiding means are adapted to contribute to a quick discharge of liquid froth from the settling chamber by transforming the swirling movement in a spiraling movement in a direction towards the combined inlet/outlet, as explained earlier. In general, at least a surface of the guiding means may be oriented as an extension of a swirling movement that is performed by the liquid froth in the settling chamber during operation, adding a direction along a longitudinal axis of the swirling movement to the swirling movement. The guiding means may comprise a rib arranged on an inner wall of the settling chamber and/or a ring-shaped element being adapted to guide the liquid froth according to a spiral shape.

The above-described and other aspects of the invention will be apparent from and elucidated with reference to the following detailed description of a number of embodiments of a device for frothing a liquid which comprises a settling chamber providing space in the device for the liquid froth to the formed during operation of the device, an inlet for letting in liquid to be frothed to the device, an inlet for letting in steam to the device, and a combined inlet/outlet for letting in frothing gas to the device for frothing the liquid and letting out liquid froth from the settling chamber, wherein, by way of practical example, it is assumed that the liquid to be frothed is milk and the frothing gas is air.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
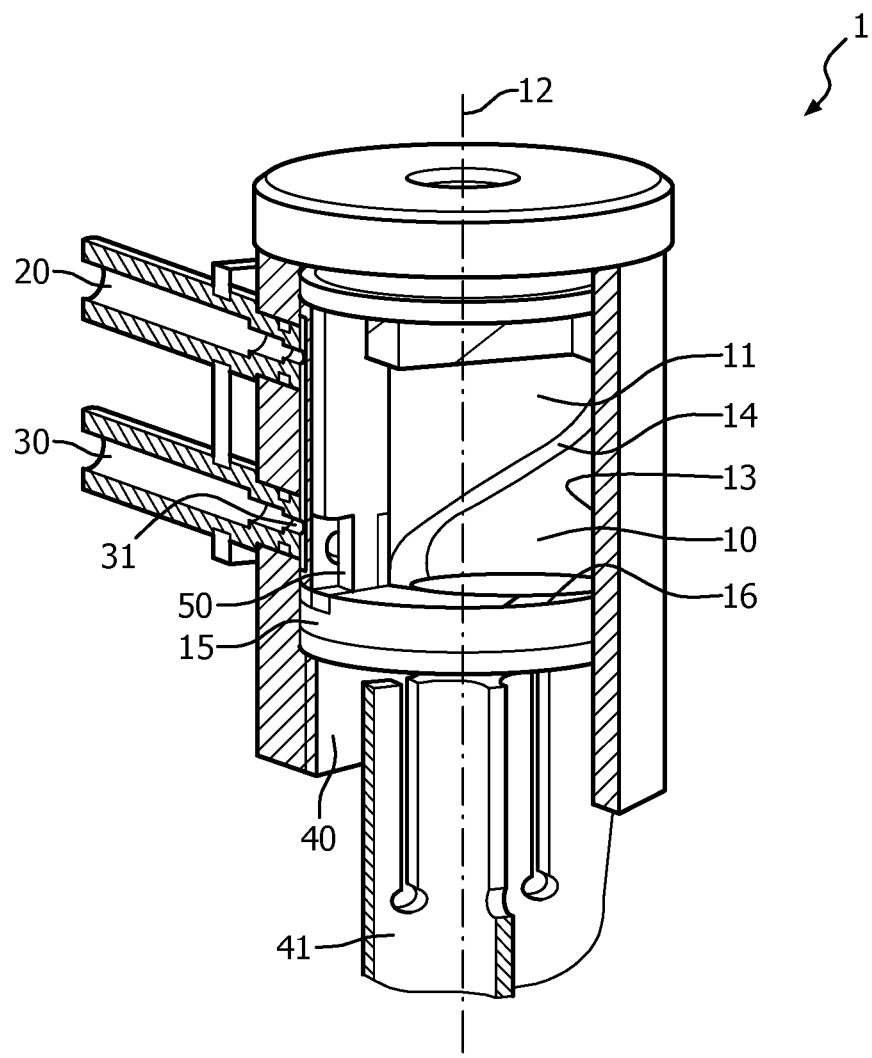
FIG. 1 shows a perspective view of a first embodiment of the device according to the invention, wherein a portion of the device is broken away in order to provide a view of an interior of the device.
Figure 2:
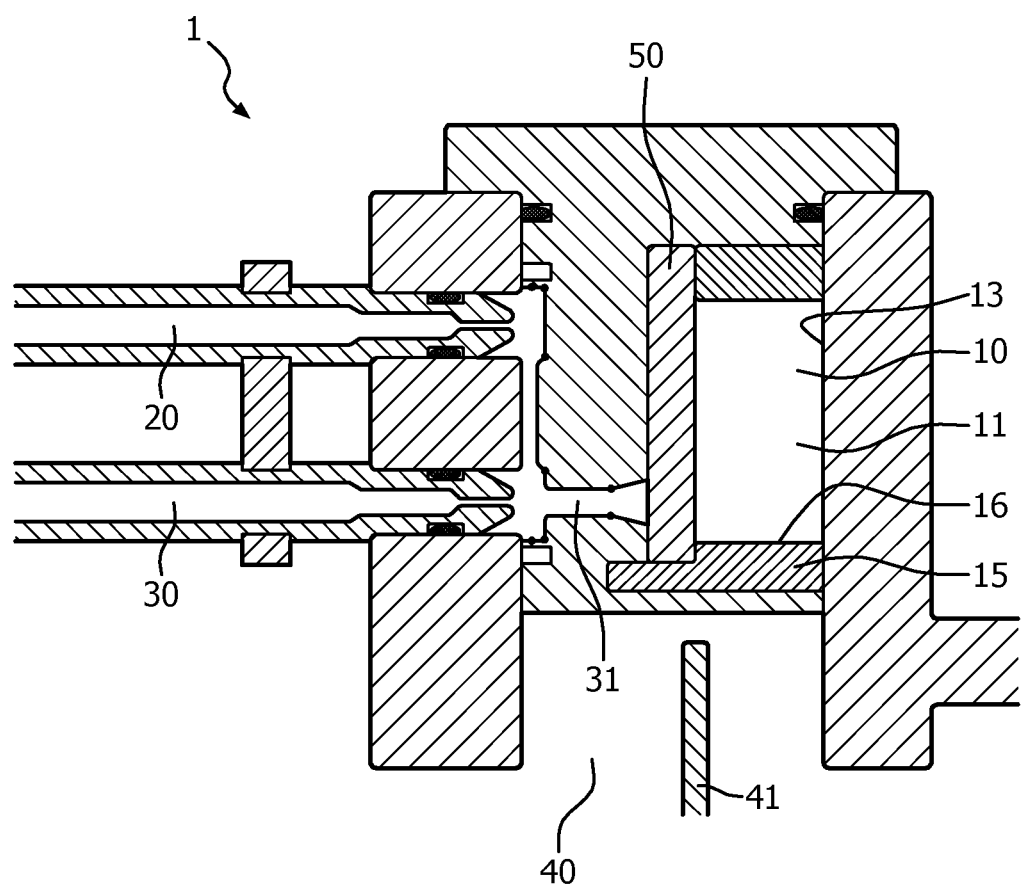
FIG. 2 shows a side view of a longitudinal section of a portion of the first embodiment of the device according to the invention as shown in FIG. 1, taken along a longitudinal/central axis of a settling chamber of the device.

FIGS. 1 and 2 provide different illustrations of a first embodiment of the device according to the invention, which will hereafter be referred to as first milk frother 1. In general, the first milk frother 1 is adapted to make and dispense milk froth during operation, wherein milk and air are used as ingredients of the milk froth, and wherein steam is used in a frothing process for heating the milk froth, performing a pumping function on the milk, and providing sufficient kinetic energy to a mixture of the milk and the air for having an effective frothing process on the basis of sufficient velocity of the mixture, wherein the steam condenses on the milk in the process.

The first milk frother 1 comprises a settling chamber 10 providing space 11 in the milk frother 1 for liquid froth to be formed during operation of the milk frother 1. As is generally known, making air to mix more and more with milk causes the mixture of the milk and the air to expand. Thus, space is needed inside the first milk frother 1 in order to let the expansion process take place in an unhindered manner. The first milk frother 1 further comprises an inlet 20 for letting in the milk to the milk frother 1, which will hereinafter be referred to as milk inlet 20, an inlet 30 for letting in the steam to the milk frother 1, which will hereinafter be referred to as steam inlet 30, and a combined inlet/outlet 40 for letting in air to the milk frother 1 for frothing the milk and letting out milk froth from the settling chamber 10.

In the shown example, the settling chamber 10 is shaped like a cylinder having a circular inner circumference. In the following, indications of orientations and/or directions of components and flows in the first milk frother 1 are given with reference to the cylinder shape of the settling chamber 10 as mentioned, particularly a direction in which a longitudinal/central axis 12 of the settling chamber 10 extends, wherein a dimension of the settling chamber 10 in the direction of the longitudinal axis 12 is denoted as being a height of the settling chamber 10, and wherein a dimension of the settling chamber 10 in a radial direction with respect to the direction of the longitudinal axis 12, i.e. a dimension in a plane extending perpendicular with respect to the longitudinal axis 12, is denoted as being a width/diameter of the settling chamber 10. Furthermore, an orientation of the first milk frother 1 as shown in FIGS. 1 and 2, which is an orientation in which the longitudinal axis 12 extends substantially in a vertical direction and the combined inlet/outlet 40 is present underneath the settling chamber 10 is regarded as being a normal orientation of the first milk frother 1, which does not alter the fact that the invention is not dependent on a specific orientation of the first milk frother 1. In any case, in the following, indications in respect of high and low are to be understood against the background of the normal orientation as mentioned.

With reference to FIG. 2, it is noted that in the shown example, the milk inlet 20 and the steam inlet 30 are located at the same radial position in the first milk frother 1, wherein the milk inlet 20 is located at a higher level than the steam inlet 30. Both the milk inlet 20 and the steam inlet 30 comprise tubes having a diameter that is significantly smaller than a diameter of the settling chamber 10 and the combined inlet/outlet 40. Furthermore, both the milk inlet 20 and the steam inlet 30 extend substantially perpendicular to the longitudinal axis 12 of the settling chamber 10. Hence, in the normal orientation of the first milk frother 1, in which the longitudinal axis 12 has a substantially vertical orientation, both the milk inlet 20 and the steam inlet 30 have a substantially horizontal orientation.

An advantage of the application of steam is that it is not necessary to use separate means for pumping the milk to the first milk frother 1. FIG. 2 illustrates that in the shown example, a restriction 31 is arranged right opposite to the steam inlet 30. In the direction in which the steam flows during operation of the first milk frother, the steam is made to flow through the restriction 31, and is allowed to expand after having passed the restriction 31. As a result, local underpressure is created, which is used for drawing in the milk. This is an application of a principle which is known as the venturi principle. Hence, during operation, a steam/milk flow is obtained, i.e. a mixture of steam and milk droplets, which passes through the restriction 31 and enters the settling chamber 10. Due to the fact that an inner side wall 13 of the settling chamber 10 is curved according to the circular inner circumference of the cylinder shape of the settling chamber 10, and the steam inlet 30 extends substantially perpendicular to the longitudinal axis 12 of the settling chamber 10, the steam/milk flow is made to perform a swirling movement inside the settling chamber 10, wherein a longitudinal axis of the swirling movement coincides with the longitudinal axis 12 of the settling chamber 10. By supplying air to the steam/milk flow in a way as will be described later on, it is achieved that milk froth is formed in the process, which is heated under the influence of the steam. The energy needed for moving the steam/milk flow and the steam/milk/air flow is supplied by the steam. The milk froth exits the settling chamber 10 through the combined inlet/outlet 40, which is arranged as an extension of the settling chamber 10 in the shown example.

The air that is needed to froth the milk is routed through an outlet path of the milk froth upwards into the first milk frother 1. In a frothing process, air which is present inside the first milk frother 1 is used, and the lack of air which arises as a result thereof is immediately replenished by a supply of air through the combined inlet/outlet 40 under the influence of underpressure associated with the lack of air. Preferably, as is the case in the shown example, a distance between the steam inlet 30 and a position where the steam/milk flow enters the settling chamber 10 is very short, for example, less than 5 mm, so that it is guaranteed that the steam is not fully condensed on the milk at that position, and there is enough steam left for providing energy to have a swirling movement inside the settling chamber 10 at a speed which is sufficient for having good mixing of milk and air and thereby yielding fine-bubbled milk froth. Furthermore, it is advantageous to have measures for ensuring that air can reach the steam/milk flow at a position which is as close as possible to the steam inlet 30, so that the frothing process can be initiated as soon as possible, at the highest possible flow speed. To this end, an obstacle 50 is applied, which is adapted to allow air to reach the steam/milk flow at a position which is close to the steam inlet 30.

In general, the obstacle 50 is adapted to determine a position where air encounters the steam/milk flow. As explained in the foregoing, this position is preferably close to the steam inlet 30, in order to avoid a situation in which a large amount of the steam has already condensed on the milk and most of the kinetic energy is lost before the frothing process has even started. Having a well-defined position is preferred in view of a desire to have a predictable frothing process which yields consistent results when consistent settings are applied, wherein results include temperature of the milk froth, quantity of the milk froth and quality of the milk froth.

In the first milk frother 1, the obstacle 50 is positioned right opposite the steam inlet 30, at a relatively small distance, for example, at a distance which is in a range of only 1 to 5 mm. In particular, in the first milk frother 1, the obstacle 50 is positioned directly behind the restriction 31, as can clearly be seen in FIG. 2. During operation of the first milk frother 1, the steam/milk flow collides with the obstacle 50, as a result of which air is drawn in at the very position where the collision occurs. In order to have a well-defined position, the obstacle 50 is provided with a sharp edge at a side of the obstacle 50 facing the steam inlet 30.

A diameter of the combined inlet/outlet 40 is large enough for allowing air to enter the first milk frother 1. In order to guarantee a continuous frothing process in the settling chamber 10, measures are taken to avoid accumulation of milk froth in the settling chamber 10, which may otherwise occur and create a situation in which a supply of fresh air to the swirling mixture of milk, steam and air in the settling chamber 10 would be blocked to a considerable extent. In the shown example, a guiding rib 14 is provided on the inner side wall 13 of the settling chamber 10, which is arranged according to a downwardly spiraling course. Hence, milk froth moving along the inner side wall 13 in the swirling movement as mentioned earlier encounters the guiding rib 14, so that the swirling movement is provided with a downward component, i.e. a component in a direction of the combined inlet/outlet 40. Due to the centrifugal forces acting on the milk froth in the swirling movement, a largest concentration of the milk froth is present at an outside of the swirling movement, so that the effect of the guiding rib 14 on the milk froth is optimal due to the arrangement of the guiding rib 14 on the inner side wall 13 of the settling chamber 10.

Besides the guiding rib 14 as mentioned, the first milk frother 1 comprises a ring-shaped guiding element 15 which is arranged at a level which is just lower than a level of the steam inlet 30. The guiding rib 14 extends between a top position in the settling chamber 10 all the way down towards the ring-shaped guiding element 15. A top surface 16 of the ring-shaped guiding element 15 is oriented according to a downwardly spiraling course. In this way, the ring-shaped guiding element 15 helps in a discharge of the milk froth, especially in a relatively low area of the settling chamber 10. Like the guiding rib 14, the ring-shaped guiding element 15 mainly acts at a position where the largest concentration of milk froth is present, namely at a position which is at the outside of the swirling movement, close to the inner side wall 13. The milk froth is allowed to pass down to the combined inlet/outlet 40 through a central space of the ring-shaped guiding element 15.

It will be understood that it is most advantageous for the downwardly spiraling course as defined by the guiding rib 14 and the top surface 16 of the ring-shaped guiding element 15 to have a rotation direction as seen in a downward direction which is the same as a direction of the swirling movement of the steam/milk/air flow in the settling chamber 10. In that way, the flow will not be interrupted in some way, and the generation of additional movement in a downward direction can take place in the smoothest fashion. In respect of the guiding rib 14, it is noted that the inner side wall 13 of the settling chamber 10 may be provided with any suitable number of guiding ribs 14, wherein it is not necessary for each of the guiding ribs 14 to extend all the way between the top position in the settling chamber 10 to the ring-shaped guiding element 15. Furthermore, it is noted that it is not necessary that both a guiding rib 14 and a ring-shaped guiding element 15 are applied when it is desired to have means for directing the milk froth towards the combined inlet/outlet 40. The directing effect is already obtained when only one of those guiding means 14, 15 is applied, although the directing effect is strongest when both guiding means 14, 15 are applied. Within the scope of the present invention, more practical examples are feasible of means for guiding the milk froth out of the settling chamber 10 through the combined inlet/outlet 40, wherein it is practical yet not essential for such means to define a downwardly spiraling shape, i.e. a shape spiraling towards the combined inlet/outlet 40.

In the combined inlet/outlet 40, a member 41 having a cross-section that is shaped like a cross is arranged for hindering the swirling movement of the milk froth, so that the swirling movement is eventually stopped and only a downward movement remains, on the basis of which a stable and steady emission of milk froth from the combined inlet/outlet 40 is obtained.

Figure 3:
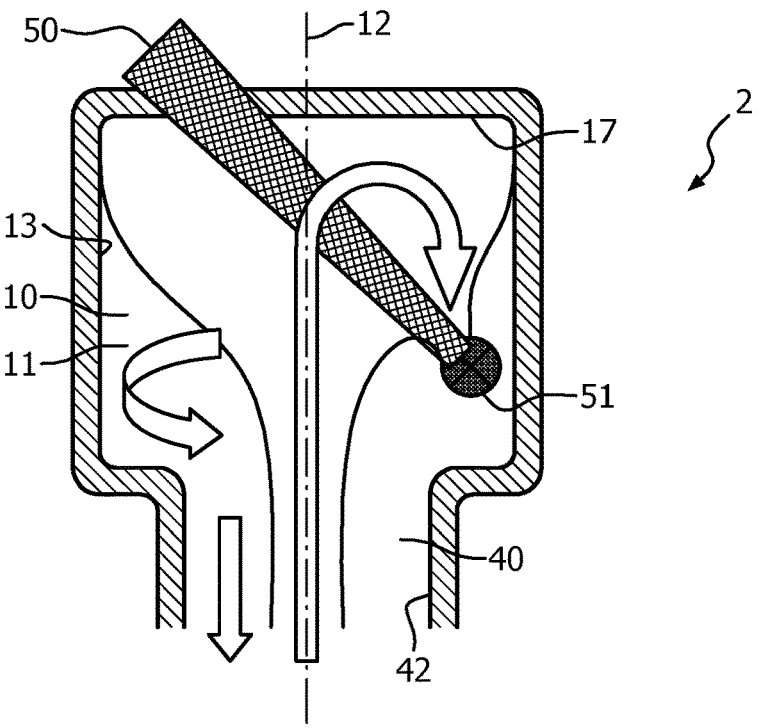
FIG. 3 diagrammatically shows a side view of a longitudinal section of a second embodiment of the device according to the invention, taken along a longitudinal/central axis of a settling chamber of the device.
Figure 4:
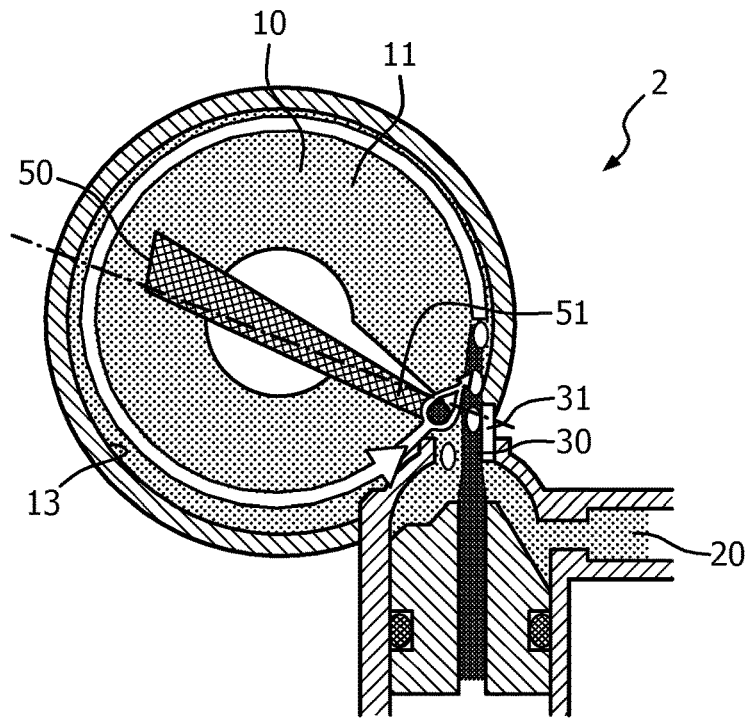
FIG. 4 diagrammatically shows a top view of a cross-section of the second embodiment of the device according to the invention as shown in FIG. 3, taken at the level of an inlet of liquid and an inlet of steam to the device.

FIGS. 3 and 4 diagrammatically show different views of different sections of a second embodiment of the device according to the invention, which will hereafter be referred to as second milk frother 2.

The second milk frother 2 has the same function as the first milk frother 1. In particular, the second milk frother 2 is also adapted to dispense hot milk froth on the basis of an input of milk, steam and air, wherein the air is allowed to enter the second milk frother 2 through a combined inlet/outlet 40, which has a function of allowing milk froth exiting the second milk frother 2 to pass in a downward direction besides a function of allowing air entering the second milk frother 2 to pass in an opposite direction, i.e. an upward direction.

In FIG. 4, it can be seen how the steam inlet 30 has a position for blowing the steam right along the inner side wall 13 of the settling chamber 10, which is advantageous in view of obtaining the swirling movement contributing to a frothing process, while minimizing a loss of kinetic energy from the steam in the transition from the steam inlet 30 to the inner side wall 13 of the settling chamber 10. One difference between the second milk frother 2 and the first milk frother 1 is that in the second milk frother 2, the milk inlet 20 is arranged at a side of the steam inlet 30, wherein the milk inlet 20 and the steam inlet 30 extend substantially perpendicular with respect to each other. Still, the concept of the steam performing a sucking action on the milk is the same, wherein the steam is made to pass through a restriction 31 in order to create a local underpressure.

Another difference between the second milk frother 2 and the first milk frother 1 resides in the arrangement of the obstacle 50 for determining a position where air that is let in to the second milk frother 2 encounters the steam/milk flow. In the second milk frother 2, the obstacle 50 extends through the settling chamber 10, slanting downwardly from an inner top wall 17 of the settling chamber 10. Alternatively, the obstacle 50 may be arranged such as to extend from the inner side wall 13 of the settling chamber 10. In either case, the obstacle 50 safeguards an air path through the settling chamber 10 towards a point where the air can mix with the steam/milk flow. The air enters the second milk frother 2 at a central position through the milk froth which is formed inside the settling chamber 10 and which exits the settling chamber 10 through the combined inlet/outlet 40, and then finds its way down to the predetermined point of encountering the steam/milk flow along the obstacle 50. At a lowest end 51 of the obstacle 50, an air pocket, i.e. a space for containing air to be taken along by the steam/milk flow, is obtained. As has already been explained in the foregoing, it is advantageous for the air to mix with the steam/milk flow at a position which is as close as possible to the steam inlet 30 in order to minimize loss of kinetic energy from the steam due to condensation of the steam on the milk. Hence, it is advantageous for the lowest end 51 of the obstacle 50 to be positioned at only a very small distance from the steam inlet 30.

In FIG. 3, an incoming flow of air is indicated by means of a large bent arrow starting at a central position in the combined inlet/outlet 40 and ending at the lowest end 51 of the obstacle 50. By means of this arrow, it is illustrated how the air first travels upward through a space which is available at a central position of the swirling movement of the steam/milk/air flow in the settling chamber 10, and is allowed to travel along the obstacle 50 from that a position at the top of the settling chamber 10 to a position where underpressure is prevailing as a result of the air being supplied to the steam/milk flow and being continually carried away with the flow. Furthermore, the swirling movement of the steam/milk/air flow in the settling chamber 10 is indicated by means of a small bent arrow, and an emission of milk froth from the second milk frother 2 is indicated by means of a small straight arrow. Thin lines indicate a generally funnel-shaped contour of the milk froth inside the settling chamber 10 and the combined inlet/outlet 40, wherein it is noted that the milk froth is supposed to be present between the thin lines and the inner wall 13 of the settling chamber 10 and an inner wall 42 of the combined inlet/outlet 40.

In FIG. 4, the swirling movement of the steam/milk/air flow along the inner wall 13 of the settling chamber 10 is indicated by means of a circular arrow. Furthermore, a space for the milk froth and a space for the air in the settling chamber 10 are indicated by means of a partly circular thin line drawn as an indication of a delimitation between those two spaces, wherein it is noted that the space for the air is present at a central position in the settling chamber 10, with a portion projecting towards the steam inlet 30.

Figure 5:
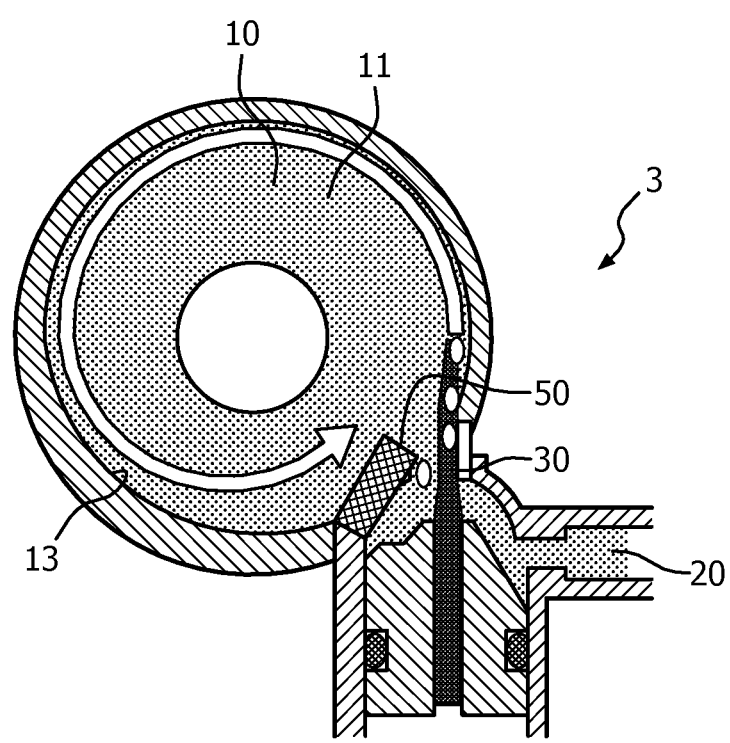
FIG. 5 diagrammatically shows a top view of a cross-section of a third embodiment of the device according to the invention, taken at the level of an inlet of liquid and an inlet of steam to the device.

FIG. 5 diagrammatically shows a top view of a cross-section of a third embodiment of the device according to the invention, which will hereafter be referred to as third milk frother 3.

The third milk frother 3 has the same function as the first milk frother 1 and the second milk frother 2. In particular, the third milk frother 3 is also adapted to dispense hot milk froth on the basis of an input of milk, steam and air, wherein the air is allowed to enter the third milk frother 3 through a combined inlet/outlet 40, which has a function of allowing milk froth exiting the third milk frother 3 to pass in a downward direction besides a function of allowing air entering the third milk frother 3 to pass in an opposite direction, i.e. an upward direction.

The arrangement of the milk inlet 20 with respect to the steam inlet 30 is the same as in the second milk frother 2. Furthermore, the arrangement of the steam inlet 30 with respect to the inner side wall 13 of the settling chamber 10 is the same as in the first milk frother 1 and the second milk frother 2. A difference between the third milk frother 3 and the other two milk frothers 1, 2 is related to the arrangement of the obstacle 50. In the third milk frother 3, the obstacle 50 is integrated in the inner side wall 13 of the settling chamber 10. In particular, the obstacle 50 comprises an inwardly curved edge of the inner side wall 13 of the settling chamber 10, directly adjacent an interruption of the inner side wall 13 which serves for allowing the steam/milk flow to enter. The swirling movement of the steam/milk/air flow along the inner wall 13 of the settling chamber 10 is indicated by means of a circular arrow, in the same way as in FIG. 4. It can clearly be seen that the curved edge 50 is arranged such as to be present at the end of a rotation movement starting at the steam inlet 30. As a result, during operation of the third milk frother 3, the steam/milk/air flow follows the curved edge 50 and is moved inwardly, away from the steam inlet 30. In fact, the steam/milk/air flow is made to pass the steam inlet 30 at a certain distance, so that an air pocket is obtained right in front of a position where the steam/milk flow enters the settling chamber 10.

Within the scope of the present invention, more practical examples are feasible of obstacles 50 which are adapted to accurately define a position where the air encounters the steam/milk flow. It follows from the foregoing that such obstacles 50 may perform their function in various ways, for example, by creating a collision area for the steam/milk flow, by creating a pathway through the milk froth, and/or by realizing some kind of flyover of the milk froth with respect to the steam/milk flow. The application of an obstacle 50 in a milk frother 1, 2, 3 does not necessarily imply the application of means 14, 15 for promoting a discharge of milk froth from the settling chamber 10, and vice versa, although it is advantageous to have a combination in order to realize operation of a milk frother 1, 2, 3 which is consistent and which yields high quality milk froth.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

For sake of clarity, it is noted that the term "liquid froth" as used in this text is to be understood as meaning froth made on the basis of a liquid. Hence, the term is to be understood as being a general term of "milk froth", for example, wherein the specific term "milk" is replaced by the general term "liquid".

The invention can be summarized as follows. A device 1, 2, 3 for frothing a liquid comprises a settling chamber 10 providing space 11 in the device for liquid froth to be formed during operation of the device 1, 2, 3; an inlet 20 for letting in liquid to be frothed to the device 1, 2, 3; an inlet 30 for letting in steam to the device 1, 2, 3 for realizing a pumping effect on liquid entering the device 1, 2, 3 through the inlet 20 for letting in liquid to the device 1, 2, 3 and thereby forming a steam/liquid flow to be supplied to the settling chamber 10; and a combined inlet/outlet 40 for letting in frothing gas to the device 1, 2, 3 for frothing the liquid and letting out liquid froth from the settling chamber 10. Furthermore, the device 1, 2, 3 comprises an obstacle 50 arranged in the device 1, 2, 3 for determining a position in the device 1, 2, 3 where frothing gas that is let in to the device 1, 2, 3 during operation of the device 1, 2, 3 encounters the steam/liquid flow, so that it is possible to have consistent operation of the device 1, 2, 3 and to allow frothing gas to reach the steam/liquid flow at a position which is as close as possible to the inlet 30 for letting in steam, corresponding to a point in time when only a minimum amount of steam has already condensed on the liquid.

The invention claimed is:

1. A device for frothing a liquid, comprising:
    a settling chamber providing space in the device for liquid froth to be formed during operation of the device;
    a liquid inlet for letting in liquid to be frothed to the device;
    a steam inlet for letting in steam to the device for realizing a pumping effect on liquid entering the device through the liquid inlet and thereby forming a steam/liquid flow to be supplied to the settling chamber;
    a combined inlet/outlet for letting in frothing gas to the device for frothing the liquid and letting out liquid froth from the settling chamber; and
    an obstacle arranged in the settling chamber at a position i) wherein a distance from the steam inlet to the obstacle is less than a distance for the steam to fully condense on the liquid, such that the steam/liquid flow collides with the obstacle, and ii) wherein frothing gas is drawn from the combined inlet/outlet in to the device during operation of the device to encounter the steam/liquid flow.

2. The device according to claim 1, wherein a side of the obstacle facing the steam inlet is provided with a sharp edge.

3. The device according to claim 1, wherein the obstacle is adapted to create a pathway for the frothing gas in the settling chamber by being positioned in a path of the liquid froth that is obtained during operation.

4. The device according to claim 1, wherein the obstacle extends through the settling chamber.

5. The device according to claim 4, wherein one end of the obstacle is attached to an inner wall of the settling chamber, and wherein another end of the obstacle is positioned opposite the steam inlet.

6. The device according to claim 1, wherein the obstacle comprises an inwardly curved edge of an inner wall of the settling chamber, which is adapted to act like a jump for the liquid froth during operation, thereby creating radial space between the liquid froth and the inlet for letting in steam to the device.

7. The device according to claim 1, comprising guiding means for guiding liquid froth out of the settling chamber through the combined inlet/outlet.

8. The device according to claim 7, wherein at least a surface of the guiding means is oriented as an extension of a swirling movement that is performed by the liquid froth in the settling chamber during operation, adding a direction along a longitudinal axis of the swirling movement to the swirling movement.

9. The device according to claim 7, wherein the guiding means comprise a rib arranged on an inner wall of the settling chamber, wherein the rib extends according to a spiraling course in a direction towards the combined inlet/outlet.

10. The device according to claim 7, wherein the guiding means comprise a ring-shaped element arranged in the settling chamber, wherein a surface of the ring-shaped element at a side of the ring-shaped element facing away from the combined inlet/outlet extends according to a spiraling course in a direction towards the combined inlet/outlet.

11. The device according to claim 1, wherein a diameter of the combined inlet/outlet is of the same order as a diameter of the settling chamber.

12. The device according to claim 1, wherein the settling chamber is shaped like a cylinder having a circular inner circumference, wherein both the liquid inlet and the steam inlet are oriented substantially perpendicular to a longitudinal axis of the settling chamber, and wherein the combined inlet/outlet is arranged as an extension of the settling chamber, in a direction along the longitudinal axis of the settling chamber.

13. A coffee maker, comprising a brewing space for allowing coffee extract to interact with water, and further comprising a device for frothing a liquid according to claim 1.

* * * * *